United States Patent
Markmiller et al.

(10) Patent No.: US 11,421,464 B2
(45) Date of Patent: Aug. 23, 2022

(54) ELECTROMECHANICAL DOOR SYSTEM FOR AN AIRCRAFT

(71) Applicant: AIRBUS HELICOPTERS DEUTSCHLAND GMBH, Donauworth (DE)

(72) Inventors: Johannes Markmiller, Munich (DE); Daniel Stegmair, Aichach-Untermauerbach (DE); Dirk Trott, Hoerselgau (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 139 days.

(21) Appl. No.: 16/874,863

(22) Filed: May 15, 2020

(65) Prior Publication Data
US 2021/0025212 A1 Jan. 28, 2021

(30) Foreign Application Priority Data
Jul. 22, 2019 (EP) .................................... 19400017

(51) Int. Cl.
*G08B 13/08* (2006.01)
*E05F 15/60* (2015.01)
*B64C 1/14* (2006.01)
*B64D 25/14* (2006.01)
(Continued)

(52) U.S. Cl.
CPC .............. *E05F 15/60* (2015.01); *B64C 1/143* (2013.01); *B64D 25/14* (2013.01);
(Continued)

(58) Field of Classification Search
CPC ..... B64C 1/1407; B64C 1/1423; B64C 1/143; B64D 25/14; E05B 47/0001; E05B 17/10;
(Continued)

(56) References Cited

U.S. PATENT DOCUMENTS

| 3,421,262 A | 1/1969 | Floehr |
| 4,787,578 A | 11/1988 | Nitsch |

(Continued)

FOREIGN PATENT DOCUMENTS

| EP | 0237810 A2 | 9/1987 |
| EP | 0597418 A1 | 5/1994 |

(Continued)

OTHER PUBLICATIONS

European Search Report for European Application No. EP 19400017. 0, Completed by the European Patent Office, Dated Jan. 30, 2020, 8 pages.

*Primary Examiner* — Chi Q Nguyen
(74) *Attorney, Agent, or Firm* — Brooks Kushman P.C.

(57) ABSTRACT

An aircraft door, and, more particularly, to an electromechanical door system for operating an aircraft door that closes an opening in the outer hull of an aircraft, as well as to a method of operating an electromechanical door system of an aircraft door that closes an opening in the outer hull of an aircraft. The electromechanical door system may be adapted for operating in a normal opening mode, an emergency opening mode, and a closing mode. If desired, the electromechanical door system may include a lifting and lowering lever, a lifting and lowering electric motor, and a gearbox that transmits a force from the lifting and lowering electric motor to the lifting and lowering lever.

20 Claims, 8 Drawing Sheets

(51) Int. Cl.
*E05B 47/00* (2006.01)
*E05B 17/10* (2006.01)
*F16H 1/10* (2006.01)
*F16H 1/16* (2006.01)
*F16H 1/28* (2006.01)
*F16H 1/32* (2006.01)
*F16H 49/00* (2006.01)

(52) U.S. Cl.
CPC .......... *E05B 47/0001* (2013.01); *E05B 17/10* (2013.01); *E05Y 2900/502* (2013.01); *E05Y 2900/531* (2013.01); *F16H 1/10* (2013.01); *F16H 1/16* (2013.01); *F16H 1/28* (2013.01); *F16H 1/32* (2013.01); *F16H 49/001* (2013.01)

(58) Field of Classification Search
CPC ............... E05F 15/60; E05Y 2900/502; E05Y 2900/531; F16H 1/10; F16H 1/16; F16H 1/28; F16H 1/32; F16H 49/001
USPC ................ 49/13, 278, 276; 244/129.5, 129.4
See application file for complete search history.

(56) References Cited

U.S. PATENT DOCUMENTS

| | | | | |
|---|---|---|---|---|
| 5,031,863 | A * | 7/1991 | Noble | B64C 1/143 244/129.5 |
| 5,251,851 | A | 10/1993 | Herrmann et al. | |
| 5,337,977 | A * | 8/1994 | Fleming | B64C 1/1407 244/129.5 |
| 5,931,415 | A * | 8/1999 | Lingard | B64C 1/143 244/129.5 |
| 6,168,114 | B1 * | 1/2001 | Erben | B64C 1/1407 244/129.5 |
| 6,691,953 | B2 * | 2/2004 | Leclerc | B64C 1/1407 244/129.5 |
| 9,567,059 | B2 * | 2/2017 | Scimone | B64C 1/14 |
| 9,592,902 | B2 * | 3/2017 | Perkins | B64C 1/1461 |
| 10,538,304 | B2 * | 1/2020 | Erben | E05B 83/42 |
| 10,807,467 | B2 * | 10/2020 | Rotenberg | B64C 25/36 |
| 10,829,969 | B2 * | 11/2020 | Rabois | E05C 3/12 |
| 2002/0014557 | A1 | 2/2002 | Erben et al. | |
| 2013/0318873 | A1 * | 12/2013 | Knijnenburg | E05F 15/70 49/31 |
| 2017/0129585 | A1 * | 5/2017 | Erben | B64C 1/143 |
| 2018/0044969 | A1 | 2/2018 | Bessettes et al. | |
| 2021/0198934 | A1 * | 7/2021 | Trotter | A62C 3/0235 |

FOREIGN PATENT DOCUMENTS

| | | |
|---|---|---|
| EP | 0992426 A2 | 4/2000 |
| EP | 1090834 A2 | 4/2001 |
| EP | 1090834 A3 | 4/2002 |
| EP | 0992426 A3 | 5/2003 |
| EP | 3323709 A1 | 5/2018 |
| EP | 3401208 A1 | 11/2018 |

* cited by examiner

ELECTROMECHANICAL DOOR SYSTEM FOR AN AIRCRAFT

CROSS-REFERENCE TO RELATED APPLICATIONS

This application claims priority to European patent application No. EP 19400017.0 filed on Jul. 22, 2019, the disclosure of which is incorporated in its entirety by reference herein.

BACKGROUND OF THE INVENTION

(1) Field of the Invention

The present embodiments relate to an aircraft door, and, more particularly, to an electromechanical door system for operating an aircraft door that closes an opening in the outer hull of an aircraft, as well as to a method of operating an electromechanical door system of an aircraft door that closes an opening in the outer hull of an aircraft.

(2) Description of Related Art

An aircraft door that closes an opening in the outer hull of an aircraft, which is sometimes also referred to as a fuselage door or an aircraft door that closes an opening in an aircraft airframe, must fulfil predefined airworthiness requirements in order to allow for a safe, secure, and reliable operation of the aircraft. Such airworthiness requirements are defined in applicable safety regulations and specifications, such as the US-American Federal Aviation Regulations (FAR) and/or the European Certification Specifications (CS) from the European Aviation Safety Agency (EASA).

According to these airworthiness requirements, an aircraft door of an aircraft must be tightly locked in an associated closed state during operation of the aircraft. The aircraft door must further be capable of taking up all loads to which they may be exposed during operation of the aircraft in the closed state. Furthermore, if the aircraft is equipped with a pressurized cabin, the aircraft door must also be capable of withstanding an internal cabin pressure during flight.

However, in case of an emergency during operation of the aircraft, it must nevertheless be possible to open the aircraft door easily and rapidly. Moreover, if the aircraft is intended for the transportation of passengers, each aircraft door of the aircraft that is provided for use by passengers must be equipped with an emergency slide that must be activatable and deployable in an emergency through corresponding operating elements of the aircraft door itself.

More specifically, in the closed state, a form-locked connection is usually engaged between an aircraft door and the aircraft at an associated aircraft body structure, with which the aircraft door is locked. In order to create such a form-locked connection between the aircraft door and the associated aircraft body structure, and for transmitting all forces resulting from the internal cabin pressure, various differing door opening/closing mechanisms are available.

Major functions of door opening/closing mechanisms include lift, latch, lock, and swivel of the aircraft door. Generally, lift, latch, and lock functions are realized by a mechanical system that requires identical operations in emergency operation mode and in normal operation mode. However, the swivel function is sometimes operated differently in normal and in emergency operation mode. For example, swiveling may be performed mechanically during normal operation mode, while swiveling may be performed by an actuator (e.g., by a pneumatically operated actuator or an electrically operated actuator) in emergency operation mode. However, an electrically operated actuator for the emergency operation mode usually requires an autonomous energy supply, which has significant disadvantages in terms of weight, cost, and maintenance.

A mechanical door opening/closing mechanism requires a very high integration effort. For example, some aircraft doors have more than 1000 single parts and require a highly accurate door structure in which tolerance requirements for brackets are in the range of +/−0.05 mm and for shafts of up to one meter in the range of +/−0.3 mm.

Moreover, such an aircraft door has to sustain high handle forces because of opening procedure requirements in case of an icing of the aircraft door, leading to significant structural reinforcements in the area of inner and outer handles. These structural reinforcements lead to disadvantages in terms of weight and cost.

The document U.S. Pat. No. 5,251,851 describes a door opening/closing mechanism for an aircraft door, which performs all door motions and locking operations for opening and closing of the aircraft door with the aid of electric motors. These electric motors operate corresponding elements of the door opening/closing mechanism through gear drives or through spindle drives to provide the power or torque moment for the respective motion.

However, this door opening/closing mechanism is only controlled on the basis of pre-programmed values. Such pre-programmed values are suitable to define a broad generic basis for a given aircraft door type, but they may require acceptance of broad tolerances between different individual aircraft doors.

Alternative conventional door opening/closing mechanisms usually require manually performed operating steps, such as closing, locking, unlocking, opening, and activating of the emergency slide. These manually performed operating steps, however, require a certain physical strength of an operator who operates the respective aircraft door. The required physical strength must not only be sufficient to overcome a basic force resulting from a corresponding weight of the respective aircraft door, but also to overcome additional forces emanating from bearing friction, seal friction, cover plate friction, side loads and thermal elongation, which usually result in comparatively high forces that must be overcome when opening the respective aircraft, door.

These comparatively high forces can be compensated in order to enable a comfortable opening of the respective aircraft door especially in case of an emergency. Thus, correspondingly high forces necessary for opening of the respective aircraft door can be reduced in order to minimize the required physical strength of an operator who operates the respective aircraft door and, in particular, who is required to open the respective aircraft door. For this purpose, usually a weight compensation device is provided as part of the door opening/closing mechanism.

The document EP 0237810 A2 describes a weight compensation device that includes a torsion bar spring that can be pre-loaded through an adjustment screw. More specifically, a translational movement of the adjustment screw is translated by means of a movement translation lever into a rotational movement of a torsion bar spring pre-loading lever in order to pre-load the torsion bar spring by means of the torsion bar spring pre-loading lever. The adjustment screw is then secured and an adjusted force of the pre-loaded torsion bar spring is permanently transferred by means of a pre-load transfer lever into the door opening/closing mechanism.

However, adjustment of this weight compensation device is only possible during maintenance, but not during operation of the respective aircraft door, and an initial adjustment (rigging) of the weight compensation device to respectively required handle forces usually demands significant efforts in aircraft major component assembly. Furthermore, a final adjustment of an underlying operation point of the weight compensation device must be performed several times during aircraft assembly in order to allow operation of the respective aircraft door within given limits. The initial installation is made into barrel, after barrel assembly, and after assembly of cabin lining and emergency slide.

Moreover, it must be considered that compensation forces provided by the given weight compensation device must be overcome when closing an opened aircraft door. In other words, there is a direct coupling of respectively required opening and closing forces so that respectively required closing handle forces required for closing an opened aircraft door cannot be influenced by means of the initial adjustment due to the fact that they result from the required compensation forces. This has a negative effect on overall required operating forces.

It should be noted that still other weight compensation devices are also known. For instance, the document U.S. Pat. No. 3,421,262 describes a load balancer for a hinged drop end door of a railway gondola car in which a single torsion bar spring acts between the door and a respective car body over the full range of movement of the door. The single torsion bar spring is energized on opening of the door and releases its energy on closing of the door. However, with this load balancer it must be considered that compensation forces provided by the latter must be overcome when opening a respective door.

The document EP 0 597 418 A1 describes an electronic controller for implementing the kinematics of an aircraft door. The closing and opening of the aircraft door can be controlled electronically using components such as stepper motors and linear actuators that are operated electrically. However, the aircraft door has to be lifted or moved upwards during the opening of the aircraft door and lowered or moved downwards during the closing of the aircraft door. Thus, an autonomous energy supply has to be installed with the aircraft door, which is usually very heavy and expensive. Furthermore, a high amount of energy has to be stored for operating the aircraft door in the normal and the emergency opening modes to provide for high forces in case of an icing on the upper door edge. These high forces require the same reinforcements as the mechanically operated door system with the same negative consequences for weight and cost.

The document US 2018/0044969 A1 describes the opening/closing phases of an aircraft electric door around a single electric motor. The airplane electric door has a locking system provided with means for locking a safety catch and a system for coordinating door movements having a single actuating electric motor that operates a conventional mechanical system. The conventional mechanical system has all the drawbacks mentioned above, including a very high integration effort, a highly accurate door structure, the operator having a certain physical strength, etc. Moreover, the aircraft electric door has to be lifted or moved upwards during the opening of the aircraft electric door and lowered or moved downwards during the closing of the aircraft electric door. Thus, an autonomous energy supply has to be installed with the aircraft electric door, which is usually very heavy and expensive.

The document EP 3 323 709 A1 describes an actuatable emergency exit door with a door actuating device. The actuatable emergency exit door initially performs a lowering movement relative to the associated structural frame during opening until a fully lowered position is reached. This lowering movement is accompanied by an inward movement, both of which are enabled by means of at least one door-mounted goose neck-shaped structure. Subsequently, the actuatable emergency exit door performs an upward swiveling opening movement at the associated structural frame starting from the fully lowered position until a fully opened position is reached. This upward swiveling opening movement is performed automatically, i.e., without need for an operator-supported action. In the fully opened position, a fully opened position retaining device blocks the actuatable emergency exit door in order to prevent closure thereof.

However, even though the actuatable emergency exit door performs an initial lowering movement during opening, the door is not lowered by means of gravity. Instead, the actuatable emergency exit door follows an underlying downward path that follows at least two door-mounted fingers which have integrated door guide rollers in order to minimize friction. These door guide rollers move within two associated tracks, i.e., structural frame-mounted guide roller brackets, which are mounted to the associated structural frame adjacent to the door-mounted fingers. A necessary degree of freedom which allows the actuatable emergency exit door to follow this downward path is given by freedom to rotate around first and second hinge axes.

The document EP 3 401 208 A1 describes an aircraft door with at least one weight compensation device, the weight compensation device comprising at least one pre-loadable torsion member, wherein the at least one pre-loadable torsion member is coupled to an adjustment unit for adjusting a respective pre-load that is applied to the at least one pre-loadable torsion member, and wherein the adjustment unit comprises at least one worm drive.

In summary, many state-of-the-art door systems for aircraft doors use mechanical components such as drive shafts, rods, bars, etc. to transfer loads. These mechanical components are connected to the door structure at several points (e.g., by means of bearings), where they introduce and/or transfer loads and cause widespread reaction forces in the door structure even during normal opening and internal jamming.

To be able to withstand these widespread reaction forces, significant reinforcements at these points are required, which lead to disadvantages in terms of weight and cost. Some door systems have a pneumatically or electrically operated actuator to assist with at least part of the opening and/or closing of the door. However, an electrically operated actuator usually requires an autonomous energy supply for the emergency operation mode, which has significant disadvantages in terms of weight, cost, and maintenance.

BRIEF SUMMARY OF THE INVENTION

It is, therefore, an objective to provide a new aircraft door that is suitable to overcome the above-described drawbacks.

The objective is solved by an aircraft door comprising the features of claim 1. More specifically, an aircraft door that closes an opening in an aircraft airframe of an aircraft, wherein the aircraft airframe is adapted for accommodating the aircraft door in a closed state may comprise an electromechanical door system that is adapted for operating in a normal opening mode, an emergency opening mode, and a closing mode, wherein the electromechanical, door system performs an aircraft door opening operation that transitions the aircraft door from the closed state to an opened state in the normal opening mode and the emergency opening mode and an aircraft door closing operation that transitions the aircraft door from the opened state to the closed state in the closing mode. The electromechanical door system may comprise a lifting and lowering lever, a lifting and lowering electric motor, and a gearbox.

The lifting and lowering lever may be attached to the aircraft door and be adapted for engaging with the aircraft airframe in the aircraft door closing operation, wherein the lifting and lowering lever lifts the aircraft door relative to the aircraft frame during the aircraft door closing operation. The lifting and lowering electric motor may be adapted for operating the lifting and lowering lever, wherein the lifting and lowering electric motor is attached to the aircraft door and coupled with the lifting and lowering lever, and wherein the lifting and lowering electric motor lifts the aircraft door relative to the aircraft airframe during the aircraft door closing operation, and dampens a movement of the aircraft door during the aircraft door opening operation when the aircraft door is lowered by means of gravity relative to the aircraft frame. The gearbox may transmit a force from the lifting and lowering electric motor to the lifting and lowering lever during the aircraft door closing operation.

According to one aspect, the electromechanical door system may comprise connectors for external power supply that are accessible from the outside of the aircraft door and coupled to the lifting and lowering electric motor for providing electricity to the lifting and lowering electric motor.

Illustratively, the aircraft door may be a downward moving aircraft door. In other words, the aircraft door may be lowered during opening relative to the aircraft, airframe instead of being lifted relative to the aircraft airframe.

A hinge arm may attach the aircraft door with the aircraft airframe. The hinge arm may have a vertical rotation axis, if desired.

Illustratively, the electromechanical door system may include electric motors with electrical drives (e.g., cycloidal drives). Thereby, the electromechanical door system is mechanically (i.e., in terms of forces and moments) decoupled from the door structure.

Furthermore, no dependency inside the aircraft door remains and tolerances can be increased. By way of example, the remaining tolerance requirement may be limited to the forward side and the aft side of the aircraft door.

Moreover, in contrast to stepper motors and linear actuators the combination of electric motors and cycloidal drives does not apply loads to the door structure. All loads can be handled within the chassis of the respective electric motor and electrical drive. Therefore, reinforcements of the door structure may be reduced to a minimum.

An aircraft door that is initially inward and then downward moving and for which swiveling in emergency operation mode is realized pneumatically requires a comparatively low amount of electrical energy storage. As an example, compared to an electrically operated aircraft door, the amount of electrical energy storage that is required in emergency operation mode may be reduced by a factor of 10.

In case of icing on the aircraft door, bigger forces need to be applied to open the aircraft door. In mechanically operated doors, the standard handle force is 150N, and the maximum is about 1500N, which corresponds to two average cabin crew members pulling on the handle with their whole weight. By way of example, the electromechanical door system, which lowers the aircraft door by means of gravity relative to the aircraft airframe, provides already through the weight of the aircraft door about 2000N.

Illustratively, the aircraft door may be opened and/or closed using an electric switch such as a push button instead of being operated using mechanical outer and inner handles and connectors for external power supply. If desired, swiveling may be performed manually or electrically.

By way of example, the electromechanical door system may be limited to two operational statuses. These operational statuses may be associated with a "Go" or "No-Go" behavior, if desired. Thus, no flights will be delayed and/or canceled due to a status that cannot be interpreted by the electromechanical door system.

An aircraft door that is initially inward and then downward moving requires the installation of an anti-lowering lever/spring mechanism, which prevents the aircraft door from crashing down accidently by its own weight during the lifting procedure. If the door would crash down accidently (e.g., by unhanding the inner handle) from its most upper position, the huge weight of the aircraft door could lead to serious damages on the aircraft door and/or the aircraft airframe. Such an anti-lowering mechanism is obsolete in the aircraft door with the electromechanical door system, because the aircraft door is always lowered in open position.

According to one aspect, the electromechanical door system further comprises a latching and locking lever with an engaged state and a released state that, is attached to the aircraft door, wherein the latching and locking lever in the engaged state is engaged with the aircraft airframe to maintain the aircraft door in the closed state, and wherein the latching and locking lever in the released state is disengaged from the aircraft airframe to enable the transition of the aircraft door from the closed to the opened state, and a latching and locking electric motor adapted for operating the latching and locking lever, wherein the latching and locking lever electric motor is attached to the aircraft door and coupled to the latching and locking lever, wherein the latching and locking electric motor moves the latching and locking lever from an engaged state to a released state when the electromechanical door system operates in the normal opening mode and the emergency opening mode and from a released state to an engaged state when the electromechanical door system operates in the closing mode.

According to one aspect, the electromechanical door system further comprises an emergency slide with an armed state and a disarmed state that is attached to the aircraft door, wherein in the armed state the emergency slide is inflated and deployed at least when the electromechanical door system operates in the emergency opening mode.

According to one aspect, the electromechanical door system further comprises an arming fork that is adapted for transitioning the emergency slide from an armed state to a disarmed state and from a disarmed state to an armed state, and an emergency slide arming electric motor adapted for operating the arming fork, wherein the emergency slide arming electric motor is attached to the aircraft door, coupled to the arming fork, and moves the arming fork to transition the emergency slide from an armed state to a disarmed state and from a disarmed state to an armed state.

According to one aspect, the electromechanical door system further comprises a door arm having a first end attached to the aircraft airframe and a second end attached to the aircraft door, wherein the aircraft door swivels outward the aircraft airframe through the opening in the aircraft airframe during the aircraft door opening operation by means of the door arm.

According to one aspect, the gearbox comprises at least one of a cycloidal drive, an epicyclic gear train, a worm drive, a strain wave gear, or a ring gear.

According to one aspect, the electromechanical door system further comprises a first electric switch button that is attached to the aircraft door, wherein pushing the first electric switch button initiates the aircraft door opening operation, and a second electric switch button that is attached to the aircraft door, wherein pushing the second electric switch button initiates the aircraft door closing operation.

According to one aspect, the electromechanical door system further comprises first and second indicator lights that are associated with the first and second electric switch buttons, respectively, wherein the first and second indicator lights indicate at least a status of the electromechanical door system.

Moreover, an aircraft may have at least one aircraft door as described above.

Furthermore, a method of operating an aircraft, door that closes an opening in an aircraft airframe may comprise the operations of in response to an activation of an electric switch button, generating an electrical signal indicating an aircraft door closing operation, swiveling the aircraft door inside the aircraft airframe by means of a door arm, using an electric motor and a lifting and lowering lever to lift the aircraft door relative to the aircraft airframe, and latching and locking the aircraft door with the aircraft airframe.

According to one aspect, latching and locking the aircraft door with the aircraft airframe further comprises using an additional electric motor to engage a latching and locking lever that locks the aircraft door inside the aircraft airframe.

According to one aspect, the method further comprises using a second additional electric motor to move an arming fork that arms an emergency slide.

According to one aspect, the method further comprises in response to an additional activation of an additional electric switch button, generating an additional electrical signal indicating an aircraft door opening operation, initiating the aircraft door opening operation, lowering the aircraft door relative to the aircraft airframe using gravitational forces, and swiveling the aircraft door outward the aircraft airframe by means of the door arm.

According to one aspect, initiating the aircraft door opening operation further comprises using an additional electric motor to move an arming fork that disarms an emergency slide.

According to one aspect, initiating the aircraft door opening operation further comprises using a second additional electric motor to disengage a latching and locking lever and release the aircraft door from the aircraft airframe.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
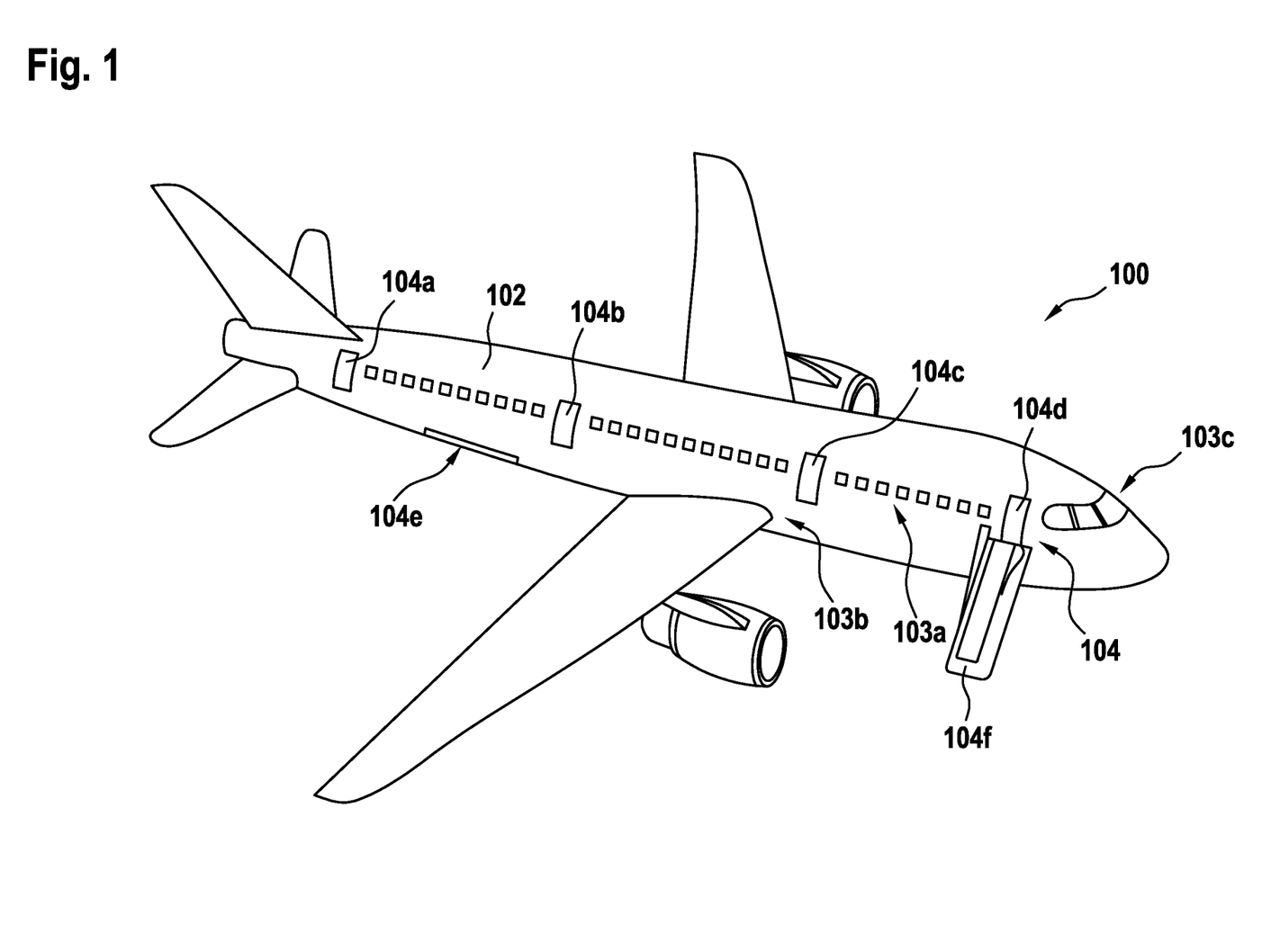
FIG. 1 shows a perspective view of an illustrative aircraft having an aircraft door with an electromechanical door system in accordance with some embodiments.

FIG. 1 shows an aircraft 100 with an aircraft airframe 102, which is sometimes also referred to as fuselage 102. The aircraft 100 illustratively comprises a passenger cabin 103a, a cargo deck 103b, and a flight deck or cockpit 103c. If desired, the aircraft 100 is accessible via a plurality of aircraft doors 104, which exemplarily comprises several cabin access doors 104a, 104b, 104c and 104d, as well as one or more cargo deck access doors 104e. By way of example, the passenger cabin 103a and the flight deck 103c are accessible via the cabin access doors 104a, 104b, 104c and 104d, and the cargo deck 103b is accessible via the one or more cargo deck access doors 104e.

The plurality of aircraft doors 104 may be adapted to close the aircraft airframe 102 (i.e., fuselage 102 of the aircraft 100) in a fluid-tight manner. According to one aspect, at least one, and preferably each one, of the plurality of aircraft doors 104 is associated with at least one emergency slide. However, for simplicity and clarity of the drawings only a single emergency slide 104f is shown. The emergency slide 104f is illustratively associated with the cabin access door 104d.

Illustratively, emergency slide 104f may have an armed state and a disarmed state. If desired, emergency slide 104f may be attached to the aircraft door 104. In the armed state, emergency slide 104f may be inflated and deployed at least when the electromechanical door system of aircraft door 104 (e.g., electromechanical door system 200 of FIG. 2) operates in an emergency opening mode. By way of example, emergency slide 104f is shown in deployed state.

One or more of the plurality of aircraft doors 104 may be equipped with a user interface having indicator lights (e.g., user interface 440 with indicator lights 450, 460 of FIG. 4) according to some embodiments. This user interface with the indicator lights may be configured for displaying information related to the status of the aircraft, doors 104 in a display area provided by the one or more of the plurality of aircraft doors 104.

Illustratively, aircraft 100 is an airplane. However, the present embodiments are not limited to airplanes. Instead, any vehicle with vehicle doors that may be equipped with an electromechanical door system is likewise contemplated. By way of example, the present electromechanical door system may alternatively be applied to vessels, such as ships and so on.

Consequently, the present electromechanical door system is not limited to aircraft doors, but can likewise be applied to any arbitrary vehicle door. However, for purposes of illustration, the present electromechanical door system is hereinafter described with respect to aircraft doors and, only exemplarily, with respect to aircraft cabin access doors.

Figure 2:
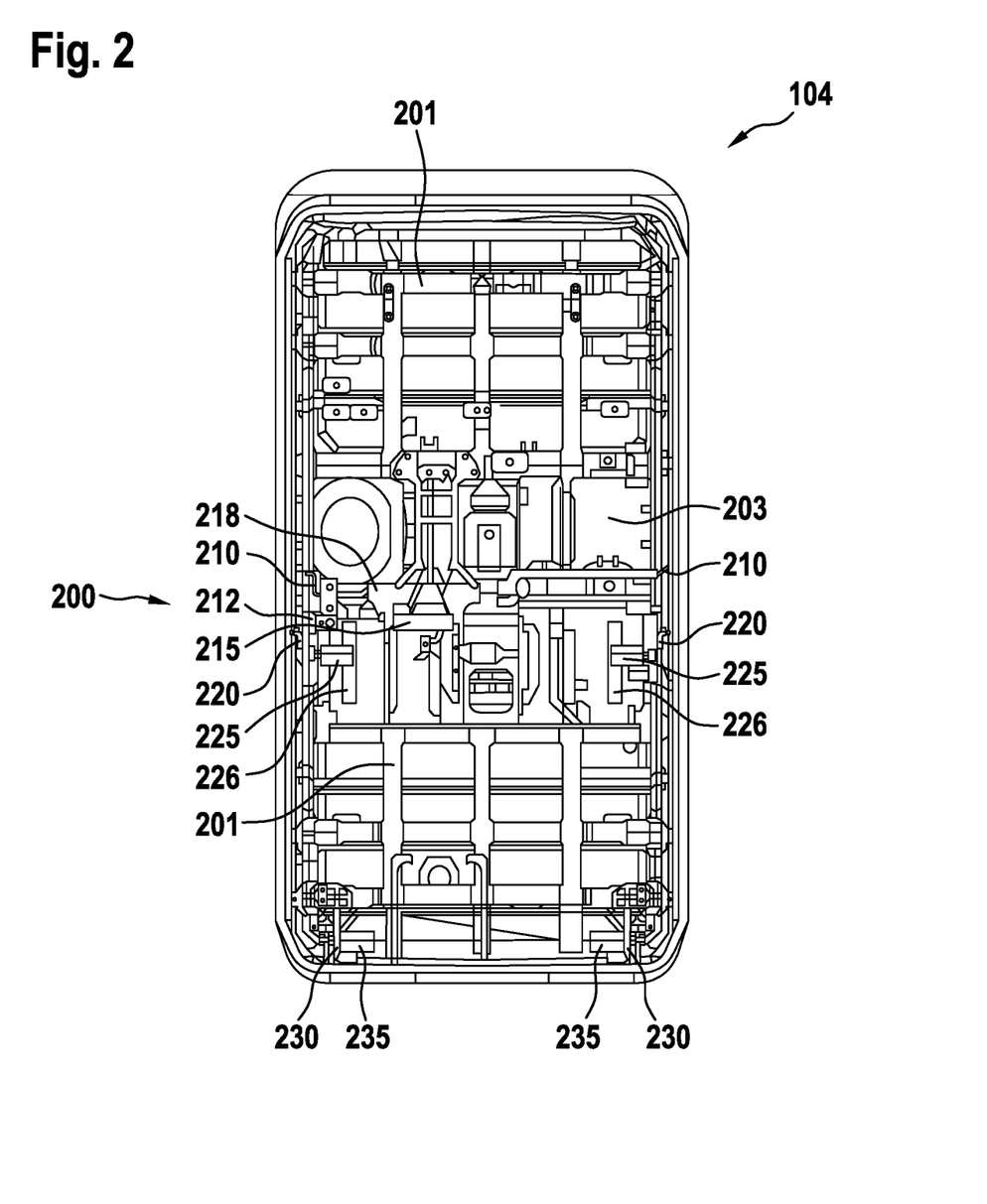
FIG. 2 shows a perspective view of an illustrative aircraft door with an electromechanical door system in accordance with some embodiments.

FIG. 2 shows a perspective view of an illustrative aircraft door 104 of FIG. 1 with an electromechanical door system 200. It should be noted that the aircraft door 104 is merely described representatively for all cabin access doors 104*a*, 104*b*, 104*c*, 104*d* of the aircraft 100 of FIG. 1. Furthermore, it should be noted that the aircraft door 104 is even more generally only described by way of example for an arbitrary vehicle door, to which the present electromechanical door system 200 can be applied, such as e.g., the cargo deck access door 104*e* of FIG. 1.

In some embodiments, aircraft door 104 may close an opening in an aircraft airframe (e.g., aircraft airframe 102 of FIG. 1) of an aircraft (e.g., aircraft 100 of FIG. 1), wherein the aircraft airframe is adapted for accommodating the aircraft door 104 in a closed state, and wherein the electromechanical door system 200 is adapted for operating in a normal opening mode, an emergency opening mode, and a closing mode.

By way of example, the electromechanical door system 200 may perform an aircraft door opening operation that transitions the aircraft door 104 from the closed state to an opened state in the normal opening mode and the emergency opening mode and an aircraft door closing operation that transitions the aircraft door 104 from the opened state to the closed state in the closing mode.

According to one aspect, the aircraft door 104 may include an associated door structure 201 and an outer skin 203. Aircraft door 104 may be equipped with latching and locking lever 220, if desired.

Latching and locking lever 220 may have an engaged state and a released state. Latching and locking lever 220 may be attached to aircraft door 104. In the engaged state, latching and locking lever 220 may be engaged with the aircraft airframe to maintain aircraft door 104 in the closed state. In the released state, latching and locking lever 220 may be disengaged from the aircraft airframe 102 to enable the transition of the aircraft door 104 from the closed to the opened state.

Latching and locking lever 220 may be activatable by latching and locking electric motor 225. Latching and locking electric motor 225 may be attached to the aircraft door 104 and coupled to the latching and locking lever 220. Latching and locking electric motor 225 may move the Latching and locking lever 220 from an engaged state to a released state when the electromechanical door system 200 operates in the normal opening mode and the emergency opening mode and from a released state to an engaged state when the electromechanical door system 200 operates in the closing mode.

Latching and locking electric motor 225 may be mounted to outer skin 203 using electric motor attachment bracket 226. If desired, latching and locking electric motor 225 may be mounted to door structure 201.

Aircraft door 104 may include arming fork 230. Arming fork 230 may be adapted for transitioning an emergency slide (e.g., emergency slide 104*f* of FIG. 1) from an armed state to a disarmed state and from a disarmed state to an armed state. For example, arming fork 230 may be activateble to initiate deployment of the emergency slide.

Arming fork 230 may be activatable by emergency slide arming electric motor 235. In other words, emergency slide arming electric motor 235 may be adapted for operating arming fork 230. Arming fork 230 and/or emergency slide arming electric motor 235 may be mounted to door structure 201, if desired.

As shown, emergency slide arming electric motor 235 is attached to the aircraft door 104 and coupled to arming fork 230. Emergency slide arming electric motor 235 may move arming fork 230 to transition the emergency slide from an armed state to a disarmed state and from a disarmed state to an armed state.

It should be noted that the present embodiments are not limited to aircraft doors that are equipped with an arming fork 230. In fact, the aircraft door 104 with arming fork 230 is merely an example of a vehicle door that may be equipped with an electromechanical door system.

Electromechanical door system 200 may include a lifting and lowering lever 210 that is attached to the aircraft door 104 and adapted for engaging with the aircraft airframe in the aircraft door closing operation. By way of example, the lifting and lowering lever 210 lifts the aircraft door 104 relative to the aircraft frame 102 during the aircraft door closing operation.

If desired, electromechanical door system 200 may include lifting and lowering electric motor 215. Lifting and lowering electric motor 215 may be adapted for operating the lifting and lowering lever 210. Illustratively, lifting and lowering electric motor 215 is attached to the aircraft door 104 (e.g., to the door structure 201 and/or using electric motor attachment bracket 226 to outer skin 203) and coupled with the lifting and lowering lever 210.

Lifting and lowering electric motor 215 may lift the aircraft door 104 relative to the aircraft airframe during the aircraft door closing operation, and dampen a movement of the aircraft door 104 during the aircraft door opening operation when the aircraft door 104 is lowered by means of gravity relative to the aircraft frame.

In some embodiments, an optional coupling mechanism 212 may couple lifting and lowering electric motor 215 with lifting and lowering lever 210 during the aircraft door closing operation and decouple the lifting and lowering electric motor 215 from the lifting and lowering lever 210 during the aircraft door opening operation, wherein the aircraft door 104 is Lowered by means of gravity relative to the aircraft frame during the aircraft door opening operation.

If desired, electromechanical door system 200 may include connectors for external power supply that are accessible from the outside of aircraft door 104 and coupled to lifting and lowering electric motor 215 for providing electricity to lifting and lowering electric motor 215. For example, connectors for external power supply may be provided on the outside of aircraft door 104 to provide access to the aircraft from the outside in case of an emergency in which the aircraft's internal power supply to aircraft door 104 is interrupted.

Illustratively, electromechanical door system 200 may include gearbox 218 that transmits a force from lifting and lowering electric motor 215 to lifting and lowering lever 210 during the aircraft door closing operation. If desired, gearbox 218 may include at least one of a cycloidal drive, an epicyclic gear train, a worm drive, a strain wave gear, or a ring gear.

Figure 3:
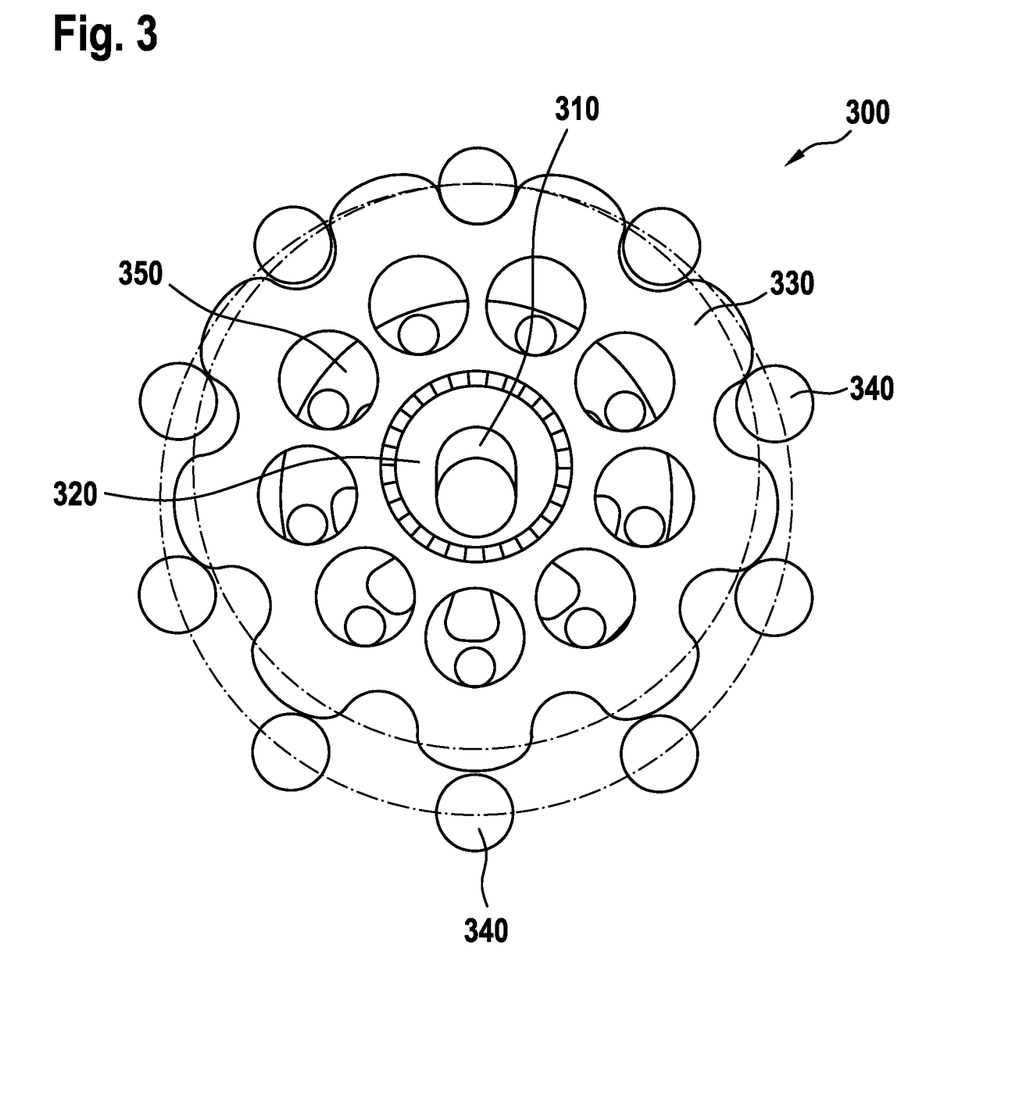
FIG. 3 is a diagram of an illustrative cycloidal drive in accordance with some embodiments.

FIG. 3 shows an illustrative cycloidal drive 300 that may be included in a gearbox in accordance with some embodiments. As shown, cycloidal drive 300 may include input shaft 310, eccentrically mounted bearing 320, cycloidal disc 330, ring pins 340, and output rollers 350.

Illustratively, input shaft 310 may drive eccentrically mounted bearing 320, and eccentrically mounted bearing 320 may drive cycloidal disc 330 in an eccentric, cycloidal motion. Cycloidal disc 330 may be geared to ring pins 340, which may be stationary.

Output rollers 350 may have pins that are placed through the face of cycloidal disc 330 and directly drive the output shaft that is coupled to these pins. Thus, the input shaft 310 performs a full rotation while the output rollers 350 move from one ring pin 340 to the next ring pin 340, thereby providing for a comparatively high gear ratio between input and output shafts.

By way of example, input shaft 310 may be coupled to a lifting and lowering electric motor (e.g., lifting and lowering electric motor 215 of FIG. 2) and the output shaft may be coupled to a lifting and lowering lever (e.g., lifting and lowering lever 210 of FIG. 2).

Figure 4:
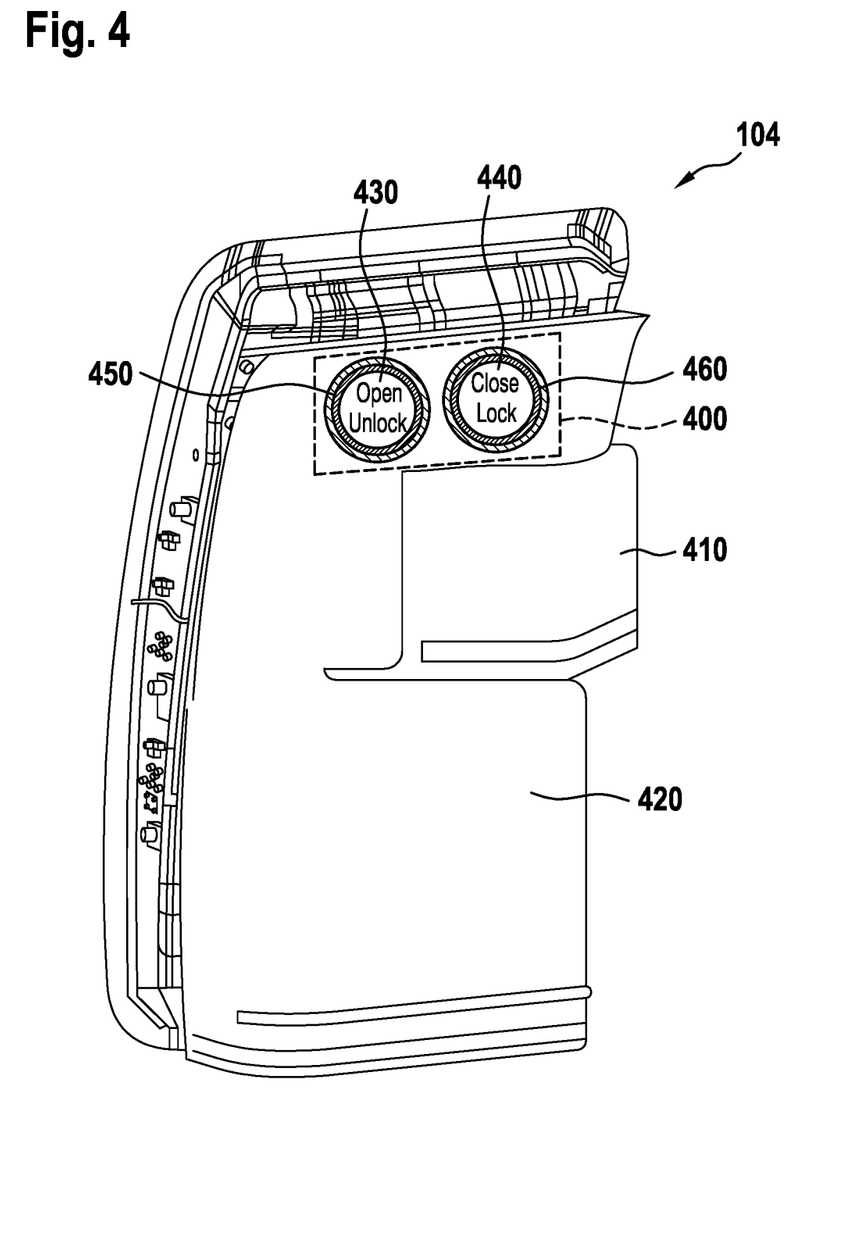
FIG. 4 is a diagram of illustrative indicator lights that are associated with electric switch buttons of an electromechanical door system of an aircraft door in accordance with some embodiments.

FIG. 4 is a diagram of illustrative indicator lights that are associated with electric switch buttons of an electromechanical door system of aircraft door 104 of FIG. 1 in accordance with some embodiments.

FIG. 4 also shows an illustrative door arm 410. Door arm 410 may have a first end that is attached to an aircraft airframe (e.g., aircraft airframe 102 of FIG. 1) and a second end that is attached to aircraft door 104. Aircraft door 104 may swivel outward the aircraft airframe through the opening in the aircraft airframe during the aircraft door opening operation by means of door arm 410, if desired.

By way of example, aircraft door 104 may have inner skin 420 that includes user interface 400. User interface 400 may include electric switch buttons 430, 440. Electric switch buttons 430, 440 may be attached to aircraft door 104.

If desired, connectors for external power supply that are accessible from the outside of aircraft door 104 may be provided on aircraft door 104. For example, connectors for external power supply may be provided on the outside of aircraft door 104 (e.g., to provide access to the aircraft from the outside in case of an emergency in which the aircraft's internal power supply to aircraft door 104 is interrupted).

If desired, pushing electric switch button 430 may initiate an aircraft door opening operation, and pushing electric switch button 440 may initiate an aircraft door closing operation.

Illustratively, indicator lights 450, 460 may be associated with electric switch buttons 430, 440, respectively. The indicator lights 450, 460 may indicate at least a status of the electromechanical door system of aircraft door 104 (e.g., electromechanical door system 200 of FIG. 2).

Figure 5A:
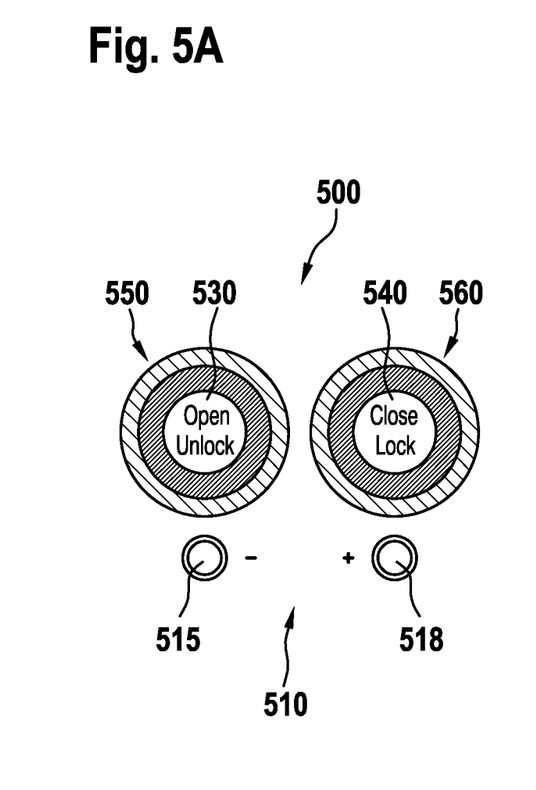
FIG. 5A is a diagram of the illustrative indicator lights of FIG. 4 in a first state in accordance with some embodiments.
Figure 5B:
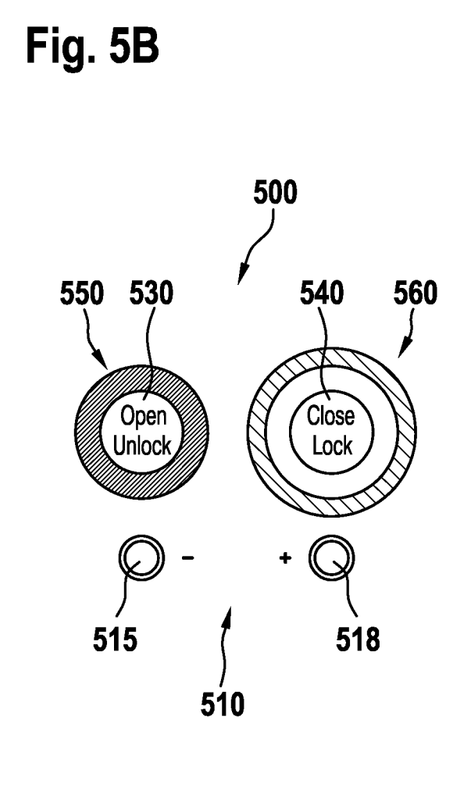
FIG. 5B is a diagram of the illustrative indicator lights of FIG. 4 in a second state in accordance with some embodiments.
Figure 5C:
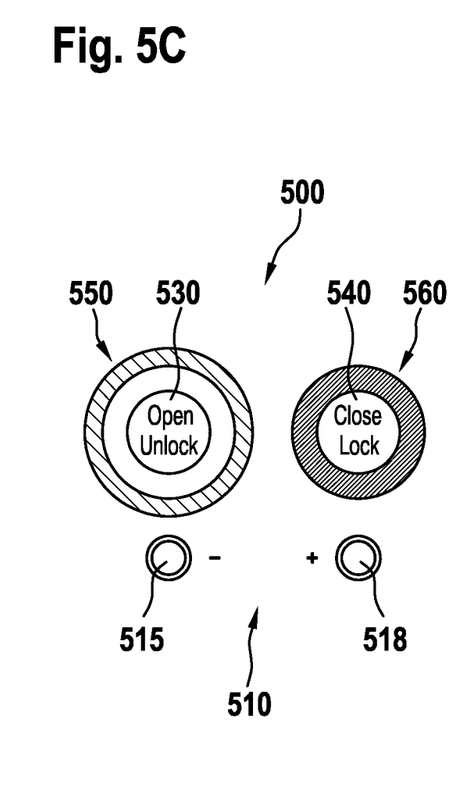
FIG. 5C is a diagram of the illustrative indicator lights of FIG. 4 in a third state in accordance with some embodiments.

FIGS. 5A, 5B, and 5C are diagrams of an illustrative user interface 500 with electric switch buttons 530, 540 and indicator lights 550,560 in first, second, and third state, showing respective exemplary statuses of the electromechanical door system in accordance with some embodiments.

FIGS. 5A, 5B, and 5C also show menu interface 510 and means for navigating a corresponding menu. As shown in FIGS. 5A, 5B, and 5C, menu interface 510 may have forward navigation button 515 and backward navigation button 518. If desired, menu interface 510 may have other means for navigating the corresponding menu. For example, menu interface 510 may include a joystick, a turning knob, a mouse pad, or any other appropriate means for navigating a menu.

If desired, each electric switch button 530, 540 of user interface 500 may have a green and a red indicator light associated with it. The green indicator light may indicate that the corresponding electric switch button 530, 540 may be operated, while the red indicator light indicates that the corresponding electric switch button 530, 540 may not be available. During a functional test, both indicator lights (i.e., green indicator light and the red indicator light) may light up.

However, it should be noted that, the color choices of indicator lights 550, 560 are not limited to the colors green and red. Instead, any colors that indicate a distinction between a go and a no-go operation may likewise be used. Furthermore, symbols or a short text, may be used instead of colors to indicate a go and a no-go operation, if desired.

Illustratively, FIG. 5A may show indicator lights 550, 560 in a functional check state in which all green and red indicator lights are lighting up. FIG. 5B may show indicator lights 550, 560 in an open-door state that indicates that the associated aircraft door is open by lighting up a red indicator light 550 for an open and/or unlock electric switch button 530 and lighting up a green indicator light 560 for a close and/or lock electric switch button 540. FIG. 5C may show indicator lights 550, 560 in a closed-door state that indicates that the associated aircraft door is closed by lighting up a green indicator light 550 for an open and/or unlock electric switch button 530 and lighting up a red indicator light 560 for a close and/or lock electric switch button 540.

Figure 6:
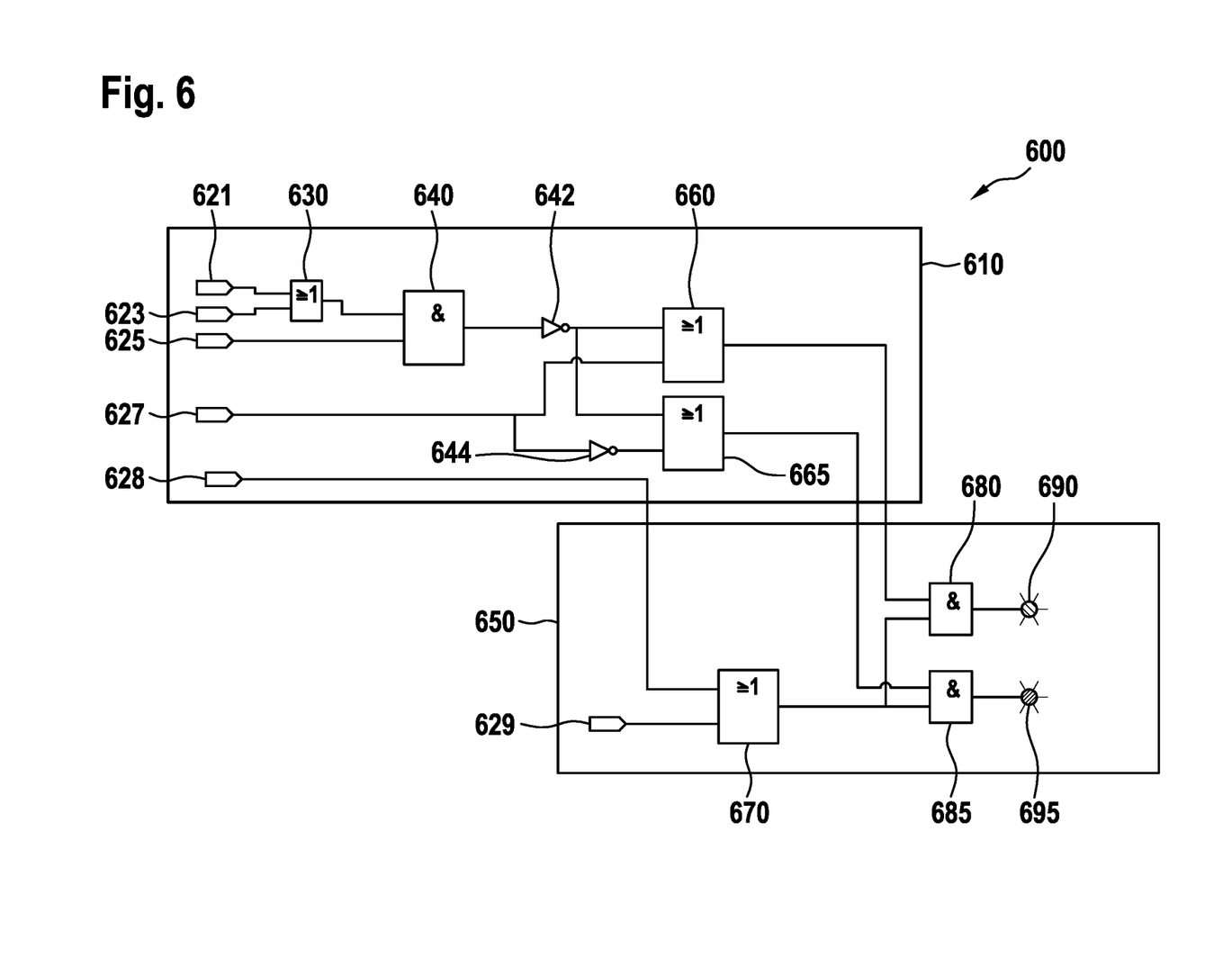
FIG. 6 is a diagram of illustrative circuitry for driving the indicator lights of FIG. 4 in accordance with some embodiments.

FIG. 6 is a diagram of illustrative circuitry for driving the indicator lights in accordance with some embodiments. The illustrative circuitry 600 of FIG. 6 may drive a green indicator light 690 and a red indicator light 695.

However, it should be noted that the indicator lights 690, 695 are not limited to the colors green and red. Instead, any colors that indicate a distinction between a go and a no-go operation may likewise be used. Furthermore, symbols or a short text may be used instead of colors to indicate a go and a no-go operation, if desired.

If desired, the illustrative circuitry 600 may be divided into control circuit 610 and display circuit 650. However, it should be noted that the division of circuitry 600 is not limited to division into a control circuit 610 and c display circuit 650. Instead, any division of circuitry 600 into sub-circuits or no division into sub-circuits may likewise be used. In fact, a single circuit may implement the functionality of circuitry 600.

As shown, control circuit 610 may include input ports 621, 623, 625, 627, 628, logical OR gates 630, 660, 665, logical AND gate 640, and inverters 642, 644. Display circuit 650 may include input port 629, logical OR gate 670, logical AND gates 680, 685, and indicator lights 690, 695.

If desired, indicator lights 690, 695 may be arranged separately from control circuit 610 and display circuit 650. For example, indicator lights 690, 695 may be separate light sources that are connected with display circuit 650 through output ports in display circuit 650.

As an example, consider the scenario in which green indicator light 690 is indicator light 550 of FIG. 5C and red indicator light 695 is indicator light 550 of FIG. 5B. Consider further, that input port 627 receives a status signal related to the current state of the aircraft door (e.g., the status signal is logical "1" if the aircraft door is closed and/or locked and logical "0" if the aircraft door is open), that input port 628 receives a status signal related to whether the aircraft is on the ground (e.g., the status signal is logical "1" if the aircraft is on the ground and logical "0" if the aircraft is airborne), that input port 629 receives a functional test signal (e.g., the functional test signal is logical "1" if a manual test is executed and logical "0" if no manual test is executed).

Finally, consider that input ports 621, 623, and 625 receive sensor signals related to different components of the electromechanical door system. For example, input ports 621 and 623 may be related to right and left latching and locking levers, respectively, (e.g., latching and locking levers 220 of FIG. 2) and input port 625 to a latching and locking electric motor (e.g., latching and locking electric motor 225 of FIG. 2) or to a control circuit thereof. Input ports 621, 623, and 625 may receive a logical "0" if the corresponding sensor detects a problem and a logical "1" if the corresponding sensor detects no problem.

In this scenario, logical OR gate 670 implements an enable signal for logical AND gates 630 and 685, which outputs a logical "1" if either or both of input ports 623, 629 receive a logical "1" (i.e., if the aircraft is on the ground and/or if a manual test is being executed). In other words, both logical AND gates 680 and 635 output the signal on the respective other input pin if the input pin that is connected to logical OR gate 670 receives a logical "1" (i.e., if logical OR gate 670 outputs a logical "1"). As a result, if the input pins of logical AND gates 680 and 685 that are connected to logical OR gate 670 disable logical AND gates 680 and 685, then green indicator light 690 and red indicator light 695 remain dark.

As an example, consider that the aircraft door is closed and/or locked (i.e., input port 627 receives a logical "1") and that inverter 642 outputs a logical "0". Thus, logical OR gate 660 outputs a logical "1" and logical OR gate 665 a logical "0". As a result, if the input pins of logical AND gates 680 and 685 that are connected to logical OR gate 670 enable logical AND gates 680 and 685, then green indicator light 690 lights up and red indicator light 695 remains dark.

As another example, consider that the aircraft door is open (i.e., input port 627 receives a logical "0") and that inverter 642 outputs a logical "0". Thus, logical OR gate 660 outputs a logical "0" and logical OR gate 665 a logical "1". As a result, if the input pins of logical AND gates 680 and 685 that are connected to logical OR gate 670 enable logical AND gates 680 and 685, then green indicator light 690 remains dark and red indicator light 695 lights up.

As yet another example, a problem detected by the sensor that is connected to input port 625, a problem detected by both sensors that are connected to input ports 621 and 623, or a problem detected by all three sensors leads to a logical "0" at the output of logical AND gate 640, and thereby to a logical "1" at the output of inverter 642 and at the outputs of logical OR gates 660 and 665. As a result, if the input pins of logical AND gates 680 and 685 that are connected to logical OR gate 670 enable logical AND gates 680 and 685, then green indicator light 690 and red indicator light 695 light up.

Note, that similar circuitry as circuitry 600 (e.g., circuitry 600 with inverter 644 removed from the input of logical OR gate 665 and inserted at the input of logical OR gate 660) may implement green indicator light 690 as Indicator light 560 of FIG. 5B and red indicator light 695 as indicator light 560 of FIG. 5C.

FIGS. 7A, 7B, 7C, and 7D show different states of an illustrative aircraft door 104 that is adapted to close an opening in an aircraft airframe 102 of an aircraft. As shown, aircraft airframe 102 and aircraft door 104 may have door stops 752 and 755, respectively.

Figure 7A:
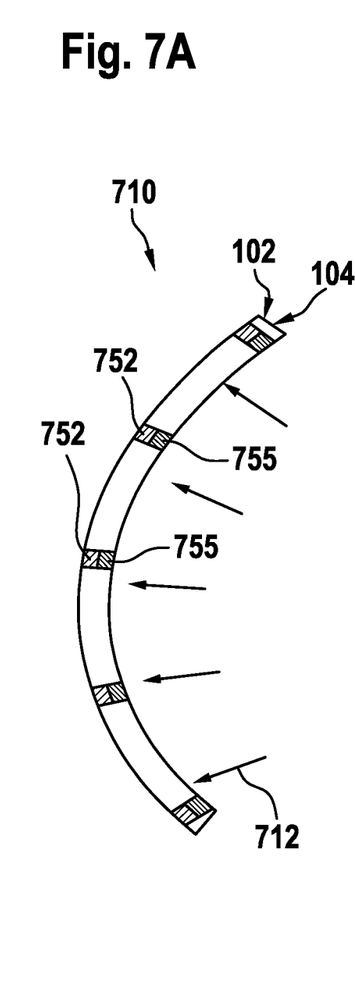
FIG. 7A is a diagram of an illustrative aircraft door in a closed state in accordance with some embodiments.

Illustratively, FIG. 7A is a diagram of aircraft door 104 in a closed state 710. In closed state 710, a latching and locking lever (e.g., latching and locking lever 220 of FIG. 2) may be in an engaged state in which the latching and locking lever is engaged with the aircraft airframe 102 to maintain the aircraft door 104 in the closed state 710. During a flight, air pressure 712 may be higher on the inside of the aircraft than on the outside of the aircraft, thereby pushing the door stops 755 of aircraft door 104 against door stops 752 of aircraft airframe 102. As a result, the aircraft door opening may be performed when the air pressure inside and outside the aircraft are equalized.

Figure 7B:
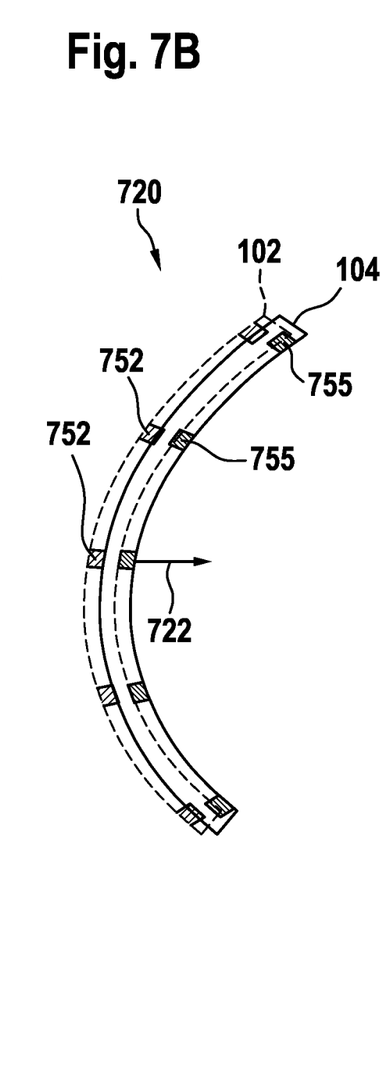
FIG. 7B is a diagram of an illustrative aircraft door in a pulled-inward state in accordance with some embodiments.

FIG. 7B is a diagram of an illustrative aircraft door 104 in a pulled-inward or partially opened state 720. In the partially opened state 720, the latching and locking lever may be in a released state in which the latching and locking lever has been disengaged from the aircraft airframe 102 to enable the transition of the aircraft door 104 from the closed to the opened state. The latching and locking lever release may be followed by a pull 722 inwards and away from the door stops 752 of the aircraft airframe 102.

Figure 7C:
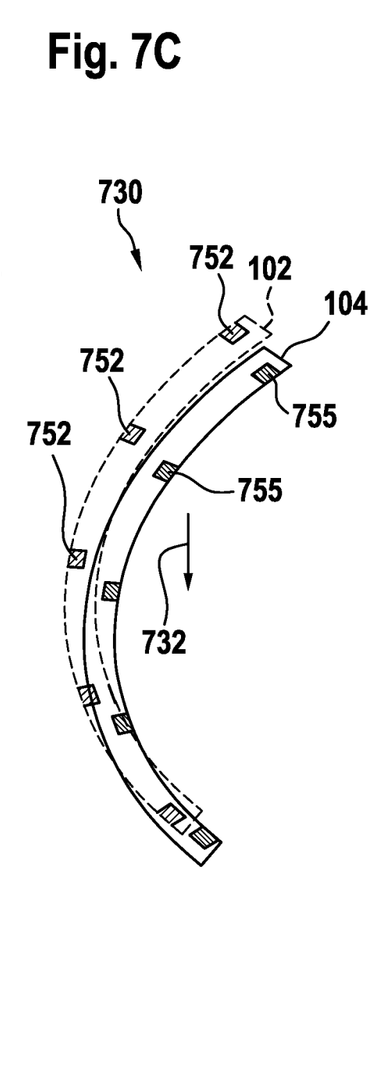
FIG. 7C is a diagram of an illustrative aircraft door in a lowered state in accordance with some embodiments.

Next, aircraft door 104 is moved downward or lowered 732 as shown in FIG. 7C in which aircraft door 104 is shown in a lowered or partially opened state 730. The lowering 732 of aircraft door 104 may disengage the door stops 755 of aircraft door 104 and door stops 752 of aircraft airframe 102 so that the way for the complete aircraft door opening, respectively outward movement of the aircraft door 104 is free.

The downward movement may be accompanied by a lifting and lowering electric motor (e.g., lifting and lowering electric motor 215 of FIG. 2) that is adapted for operating a lifting and lowering lever. The lifting and lowering electric motor may be attached to the aircraft door 104, coupled with the lifting and lowering lever, and dampen a movement of the aircraft door 104 during the aircraft door opening operation when the aircraft door 104 is lowered by means of gravity relative to the aircraft frame 102.

Figure 7D:
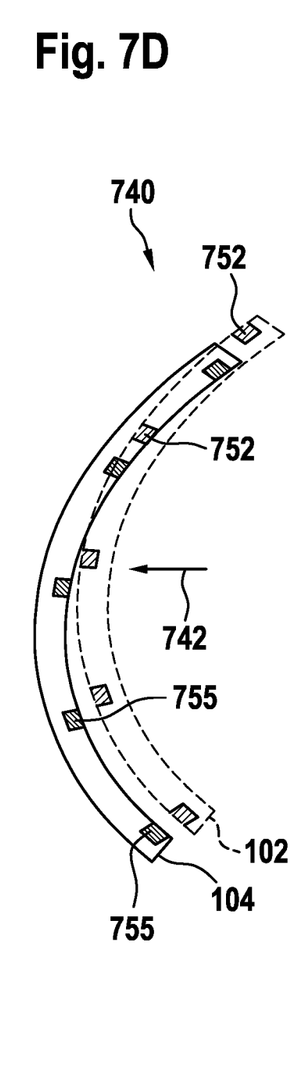
FIG. 7D is a diagram of an illustrative aircraft door in a swiveled-outward state in accordance with some embodiments.

In a last step, the aircraft door 104 may swivel outward by means of a door arm (e.g., door arm 410 of FIG. 4). Thereby, as shown in FIG. 7D, the aircraft door 104 is swiveling 742 around a vertical aircraft door axis and a vertical aircraft airframe axis to reach a swiveled-outward or completely opened state 740.

Figure 8:
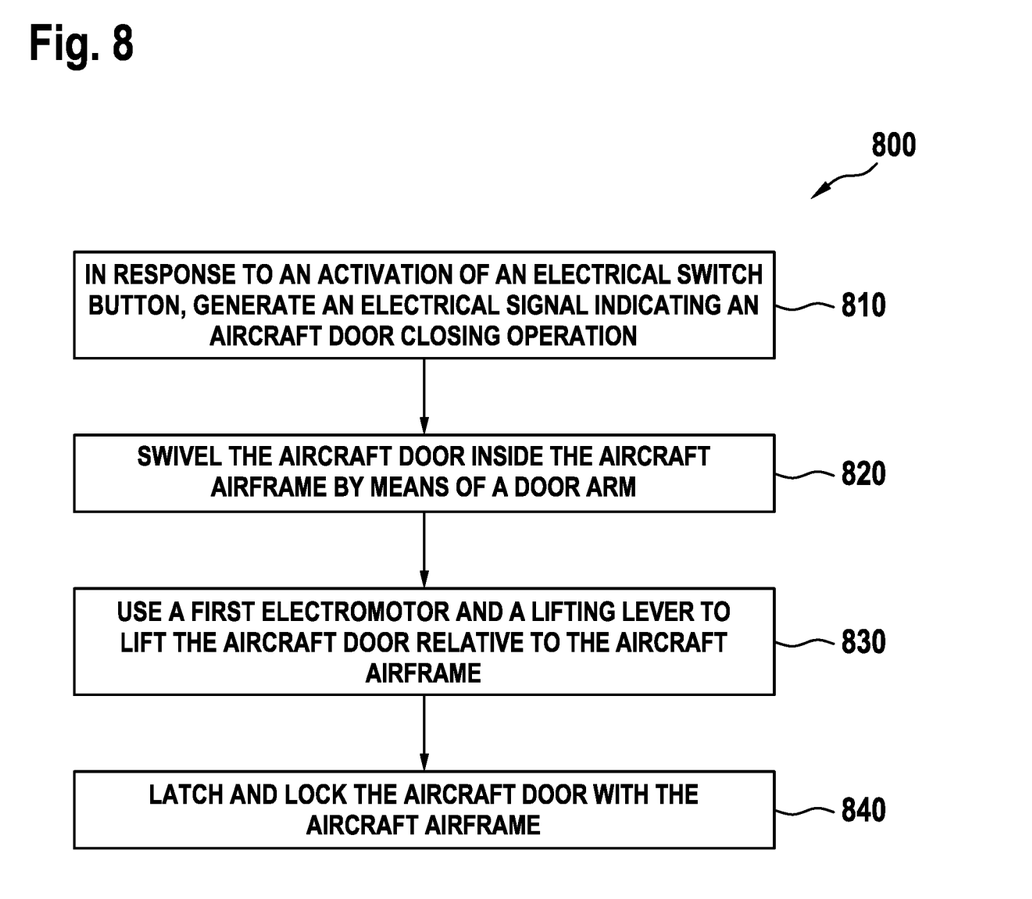
FIG. 8 is a diagram of a flowchart showing illustrative operations for operating an electromechanical door system of an aircraft door in accordance with some embodiments.

FIG. 8 is a diagram of a flowchart showing illustrative operations for operating an electromechanical door system of an aircraft door in accordance with some embodiments.

During operation 810, the electromechanical door system may, in response to an activation of an electric switch button, generate an electrical signal indicating an aircraft door closing operation. For example, a user may activate electric switch button 440 of FIG. 4 to lock aircraft door 104. As a response to the activation of the electric switch button 440, electromechanical door system 200 of FIG. 2 may generate an electrical signal indicating an aircraft door closing operation.

During operation 820, the electromechanical door system may swivel the aircraft door inside the aircraft airframe by means of a door arm.

During operation 830, the electromechanical door system may use an electric motor and a lifting and lowering lever to lift the aircraft door relative to the aircraft airframe. For example, electromechanical door system 200 of FIG. 2 may use lifting and lowering electric motor 215 and lifting and lowering lever 210 to lift aircraft door 104 relative to an aircraft airframe (e.g., aircraft airframe 102 of FIG. 1).

During operation 840, the electromechanical door system may latch and lock the aircraft door with the aircraft airframe. For example, the electromechanical door system of FIG. 2 may use latching and locking electric motor 225 to engage latching and locking lever 220 that locks the aircraft door 104 with the aircraft airframe.

It should be noted that modifications to the above described embodiments are within the common knowledge of the person skilled in the art and, thus, also considered as being part of the present invention.

For instance, the color of indicator lights 690, 695 of FIG. 6 are green and red, respectively. However, any other appropriate color which indicates that a corresponding functionality is available may be selected instead. For example, indicator lights 690, 695 may be selected to be blue and yellow, respectively. Furthermore, indicator lights 690, 695 may be replaced by symbols that may light up or by indicators that cross out a certain functionality if that functionality is not available.

Furthermore, circuitry 600 of FIG. 6 may be modified and/or include different components as shown with changing its functionality. As an example, logical AND gate 640 and inverter 642 may be replaced by a logical NAND gate. As another example, input port 628 may be moved from control circuit 610 to display circuit 650. As yet another example, logical AND gate 680 and all of its fanin cone up until input ports 621, 623, 625, 627, 628, 629 may be replaced by a 6-input look-up fable (LUT). Similarly, logical AND gate 685 and all of its fanin cone up until input ports 621, 623, 625, 627, 628, 629 may be replaced by a 6-input look-up table (LUT)

REFERENCE LIST

100 aircraft
102 aircraft airframe, fuselage
103a aircraft; passenger cabin
103b aircraft cargo deck
103c aircraft flight deck
103d cabin floor
104 aircraft door
104a, 104b, 104c, 104a cabin access doors
104e cargo deck access door
104f emergency slide
200 electromechanical door system
201 door structure
203 outer skin
210 lifting and lowering lever
212 coupling mechanism
215 lifting and lowering electric motor
218 gearbox
220 latching and locking lever
225 latching and locking electric motor
226 electric motor attachment bracket
230 arming fork
235 emergency slide arming electric motor
300 cycloidal drive
310 input shaft
320 eccentrically mounted bearing
330 cycloidal disc
340 ring pins
350 output rollers
400 user interface
410 door arm
420 inner skin
430, 440 electric switch button
450, 460 indicator lights
500 user interface
510 menu interface
515 forward navigation button
518 backward navigation button
530, 540 electric switch button
550, 560 indicator lights
600 logic circuit
610 control circuit
621, 623, 625, 627, 628, 629 input signals
630 logical OR gate
640 logical AND gate
642, 644 inverter
650 display circuit
660, 665, 670 logical OR gate
680, 685 logical AND gate
690, 695 indicator lights
710 aircraft door in closed state
712 air pressure
720 aircraft door in partially opened state
722 Latch and lock release followed by pull
730 aircraft door in partially opened state
732 lowering
740 aircraft door in completely opened state
742 swiveling
752, 755 door stops
800 method
810, 820, 830, 840 operations

What is claimed is:

1. An aircraft door that closes an opening in an aircraft airframe of an aircraft, wherein the aircraft airframe is adapted for accommodating the aircraft door in a closed state, comprising:
   an electromechanical door system that is adapted for operating in a normal opening mode, an emergency opening mode, and a closing mode, wherein the electromechanical door system performs an aircraft door opening operation that transitions the aircraft door from the closed state to an opened state in the normal opening mode and the emergency opening mode and an aircraft door closing operation that transitions the aircraft door from the opened state to the closed state in the closing mode, the electromechanical door system comprising:
   a lifting and lowering lever that is attached to the aircraft door and adapted for engaging with the aircraft airframe in the aircraft door closing operation, wherein the lifting and lowering lever lifts the aircraft door relative to the aircraft frame during the aircraft door closing operation;
   a lifting and lowering electric motor adapted for operating the lifting and lowering lever, wherein the lifting and lowering electric motor is attached to the aircraft door and coupled with the lifting and lowering lever, and wherein the lifting and lowering electric motor lifts the aircraft door relative to the aircraft airframe during the aircraft door closing operation, and dampens a movement of the aircraft door during the aircraft door opening operation when the aircraft door is lowered by means of gravity relative to the aircraft frame; and
   a gearbox that transmits a force from the lifting and lowering electric motor to the lifting and lowering lever during the aircraft door closing operation.

2. The aircraft door of claim 1, wherein the electromechanical door system further comprises:

a latching and locking lever with an engaged state and a released state that is attached to the aircraft door, wherein the latching and locking lever in the engaged state is engaged with the aircraft airframe to maintain the aircraft door in the closed state, and wherein the latching and locking lever in the released state is disengaged from the aircraft airframe to enable the transition of the aircraft door from the closed to the opened state; and a latching and locking electric motor adapted for operating the latching and locking lever, wherein the latching and locking lever electric motor is attached to the aircraft door and coupled to the latching and locking lever, wherein the latching and locking electric motor moves the latching and locking lever from an engaged state to a released state when the electromechanical door system operates in the normal opening mode and the emergency opening mode and from a released state to an engaged state when the electromechanical door system operates in the closing mode.

3. The aircraft door of claim 1, wherein the electromechanical door system further comprises:

an emergency slide with an armed state and a disarmed state that is attached to the aircraft door, wherein in the armed state the emergency slide is inflated and deployed at least when the electromechanical door system operates in the emergency opening mode.

4. The aircraft door of claim 3, wherein the electromechanical door system further comprises:

an arming fork that is adapted for transitioning the emergency slide from an armed state to a disarmed state and from a disarmed state to an armed state; and an emergency slide arming electric motor adapted for operating the arming fork, wherein the emergency slide arming electric motor is attached to the aircraft door, coupled to the arming fork, and moves the arming fork to transition the emergency slide from an armed state to a disarmed state and from a disarmed state to an armed state.

5. The aircraft door of claim 1, wherein the electromechanical door system further comprises:

a door arm having a first end attached to the aircraft airframe and a second end attached to the aircraft door, wherein the aircraft door swivels outward the aircraft airframe through the opening in the aircraft airframe during the aircraft door opening operation by means of the door arm.

6. The aircraft door of claim 1, wherein the gearbox comprises at least one of a cycloidal drive, an epicyclic gear train, a worm drive, a strain wave gear, or a ring gear.

7. The aircraft door of claim 1, wherein the electromechanical door system further comprises:

a first electric switch button that is attached to the aircraft door, wherein pushing the first electric switch button initiates the aircraft door opening operation; and a second electric switch button that is attached to the aircraft door, wherein pushing the second electric switch button initiates the aircraft door closing operation.

8. The aircraft door of claim 7, wherein the electromechanical door system further comprises:

first and second indicator lights that are associated with the first and second electric switch buttons, respectively, wherein the first and second indicator lights indicate at least a status of the electromechanical door system.

9. An aircraft comprising at least one aircraft door of claim 1.

10. A method of operating an aircraft door that closes an opening in an aircraft airframe of claim 1, comprising:

in response to an activation of an electric switch button, generating an electrical signal indicating an aircraft door closing operation;

swiveling the aircraft door inside the aircraft airframe by means of a door arm;

using an electric motor and a lifting and lowering lever to lift the aircraft door relative to the aircraft airframe; and latching and locking the aircraft door with the aircraft airframe.

11. The method of claim 10, wherein latching and locking the aircraft door with the aircraft airframe further comprises:

using an additional electric motor to engage a latching and locking lever that locks the aircraft door inside the aircraft airframe.

12. The method of claim 11, further comprising:

using a second additional electric motor to move an arming fork that arms an emergency slide.

13. The method of claim 10, further comprising:

in response to an additional activation of an additional electric switch button, generating an additional electrical signal indicating an aircraft door opening operation;

initiating the aircraft door opening operation;

lowering the aircraft door relative to the aircraft airframe using gravitational forces; and swiveling the aircraft door outward the aircraft airframe by means of the door arm.

14. The method of claim 13, wherein initiating the aircraft door opening operation further comprises:

using an additional electric motor to move an arming fork that disarms an emergency slide.

15. The method of claim 14, wherein initiating the aircraft door opening operation further comprises:

using a second additional electric motor to disengage a latching and locking lever and release the aircraft door from the aircraft airframe.

16. An aircraft door that closes an opening in an aircraft airframe of an aircraft, the aircraft airframe accommodating the aircraft door in a closed state, the aircraft door comprising:

an electromechanical door system adapted for operating in a normal opening mode, an emergency opening mode, and a closing mode, wherein the electromechanical door system is adapted to perform an aircraft door opening operation to transition the aircraft door from the closed state to an opened state in the normal opening mode and the emergency opening mode and an aircraft door closing operation to transition the aircraft door from the opened state to the closed state in the closing mode, the electromechanical door system comprising:

a lifting and lowering lever attached to the aircraft door and adapted for engaging with the aircraft airframe in the aircraft door closing operation, wherein the lifting and lowering lever is adapted to lift the aircraft door relative to the aircraft frame during the aircraft door closing operation;

a lifting and lowering electric motor adapted for operating the lifting and lowering lever, wherein the lifting and lowering electric motor is attached to the aircraft door and coupled with the lifting and lowering lever, and wherein the lifting and lowering electric motor is adapted to lift the aircraft door relative to the aircraft airframe during the aircraft door closing operation, and dampen a movement of the aircraft door during the aircraft door opening operation when the aircraft door is lowered by gravity relative to the aircraft frame;

a gearbox adapted to transmit a force from the lifting and lowering electric motor to the lifting and lowering lever during the aircraft door closing operation a latching and locking lever with an engaged state and a released state that is attached to the aircraft door, wherein the latching and locking lever in the engaged state is adapted to engage with the aircraft airframe to maintain the aircraft door in the closed state, and wherein the latching and locking lever in the released state is adapted to disengage from the aircraft airframe to enable the transition of the aircraft door from the closed to the opened state; and a latching and locking electric motor adapted for operating the latching and locking lever, wherein the latching and locking lever electric motor is attached to the aircraft door and coupled to the latching and locking lever, wherein the latching and locking electric motor is adapted to move the latching and locking lever from an engaged state to a released state when the electromechanical door system operates in the normal opening mode and the emergency opening mode and from a released state to an engaged state when the electromechanical door system operates in the closing mode.

17. The aircraft door of claim 16, wherein the electromechanical door system further comprises:

an emergency slide with an armed state and a disarmed state attached to the aircraft door, wherein in the armed state the emergency slide is adapted to inflate and deploy at least when the electromechanical door system operates in the emergency opening mode.

18. The aircraft door of claim 16, wherein the electromechanical door system further comprises:

a door arm having a first end attached to the aircraft airframe and a second end attached to the aircraft door, wherein the aircraft door is adapted to swivel outward the aircraft airframe through the opening in the aircraft airframe during the aircraft door opening operation by means of the door arm.

19. An aircraft door that closes an opening in an aircraft airframe of an aircraft, the aircraft airframe accommodating the aircraft door in a closed state, the aircraft door comprising:

an electromechanical door system adapted for operating in a normal opening mode, an emergency opening mode, and a closing mode, wherein the electromechanical door system is adapted to perform an aircraft door opening operation to transition the aircraft door from the closed state to an opened state in the normal opening mode and the emergency opening mode and an aircraft door closing operation to transition the aircraft door from the opened state to the closed state in the closing mode, the electromechanical door system comprising:

a lifting and lowering lever attached to the aircraft door and adapted for engaging with the aircraft airframe in the aircraft door closing operation, wherein the lifting and lowering lever is adapted to lift the aircraft door relative to the aircraft frame during the aircraft door closing operation;

a lifting and lowering electric motor adapted for operating the lifting and lowering lever, wherein the lifting and lowering electric motor is attached to the aircraft door and coupled with the lifting and lowering lever, and wherein the lifting and lowering electric motor is adapted to lift the aircraft door relative to the aircraft airframe during the aircraft door closing operation, and dampen a movement of the aircraft door during the aircraft door opening operation when the aircraft door is lowered by gravity relative to the aircraft frame;

a gearbox adapted to transmit a force from the lifting and lowering electric motor to the lifting and lowering lever during the aircraft door closing operation; and an emergency slide with an armed state and a disarmed state that is attached to the aircraft door, wherein in the armed state the emergency slide is adapted to inflate and deploy at least when the electromechanical door system operates in the emergency opening mode.

20. The aircraft door of claim 19, wherein the electromechanical door system further comprises:

a first electric switch button attached to the aircraft door, wherein the first electric switch button is adapted to initiate the aircraft door opening operation when pushed; and a second electric switch button attached to the aircraft door, wherein the second electric switch button is adapted to initiate the aircraft door closing operation when pushed.

* * * * *